United States Patent
Yudanov

(10) Patent No.: US 7,610,881 B2
(45) Date of Patent: Nov. 3, 2009

(54) APPARATUS FOR AN INTERNAL COMBUSTION ENGINE

(75) Inventor: Sergi Yudanov, Västra Frölunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 303 days.

(21) Appl. No.: 11/721,182

(22) PCT Filed: Jan. 12, 2005

(86) PCT No.: PCT/SE2005/000023

§ 371 (c)(1),
(2), (4) Date: Jun. 8, 2007

(87) PCT Pub. No.: WO2006/075936

PCT Pub. Date: Jul. 20, 2006

(65) Prior Publication Data

US 2009/0250022 A1    Oct. 8, 2009

(51) Int. Cl.
*F01L 9/02* (2006.01)
(52) U.S. Cl. .............. 123/90.12; 123/90.15; 123/90.16; 251/12
(58) Field of Classification Search .............. 123/90.12, 123/90.13, 90.15, 90.16; 251/12
See application file for complete search history.

(56) References Cited

U.S. PATENT DOCUMENTS 5,216,988 A    6/1993  Taxon
5,327,858 A *  7/1994  Hausknecht ............. 123/90.12
6,237,551 B1   5/2001  Macor et al.

FOREIGN PATENT DOCUMENTS

WO      9706355 A1   2/1997
WO      2004005677   1/2004

OTHER PUBLICATIONS

International Search Report for corresponding International Application PCT/SE2005/000023.

* cited by examiner

*Primary Examiner*—Zelalem Eshete
(74) *Attorney, Agent, or Firm*—WRB-IP LLP

(57) ABSTRACT

A valve actuation system for providing added motion in the valve mechanism of an internal combustion engine with at least one inlet valve and at least one exhaust valve is provided. The valve mechanism includes a rotatable camshaft including rising and falling ramps designed to interact with a valve control plunger inside a cylinder for actuation of the inlet or exhaust valve under the action of a valve spring. The cylinder communicates with a hydraulic fluid feed line via a check valve and with a hydraulic control circuit allowing a return movement of a valve to be delayed in relation to the timing of the corresponding falling ramp. The hydraulic control circuit includes a first and a second hydraulic fluid flow restrictor connected to the control plunger cylinder at different levels along its longitudinal axis. A selector valve enables a connection between the cylinder and hydraulic fluid return line to be opened via either one only or both flow restrictors.

14 Claims, 5 Drawing Sheets

APPARATUS FOR AN INTERNAL COMBUSTION ENGINE

BACKGROUND AND SUMMARY

The present invention relates to a valve actuation system for providing added motion in the valve mechanism of an internal combustion engine with at least one inlet valve and at least one exhaust valve, the valve mechanism comprising a rotatable camshaft with a cam curve including rising and falling ramps designed to interact with a valve control plunger being movable inside a cylinder for actuation of the inlet or exhaust valve under the action of a valve spring, the control plunger cylinder communicating with a hydraulic fluid feed line and a hydraulic control circuit allowing a return movement of a valve to be delayed in relation to the timing of the corresponding falling ramp.

In internal combustion engines for vehicles it is sometimes desirable to have the facility for switching between different operating modes. For example, it is possible to switch between a conventional symmetrical cycle and an asymmetrical cycle, such as a so-called Miller cycle, by varying the timing of the inlet valve closure during the engine's induction stroke. The advantage in being able to switch between these different operating modes lies, for example, in the ability to vary the effective compression ratio of the engine in order to optimize efficiency and reduce exhaust emissions to a minimum. For this purpose, therefore, variable valve actuation is necessary.

One known method to achieve variable valve movements is by means of mechanical-hydraulic systems of the "added motion" type, e.g. described WO 2004/005677. According to this document, the closing phase of a valve can be delayed for an adjustable period of time counteracting the closing force of the valve spring. A two-way hydraulic control valve is used for activating the added motion function and for controlling engine valve closing.

One disadvantage of such a system is that it is not particularly suitable for providing delayed engine valve closing in part-lift position or multiple stages. It can sometimes be desirable to delay engine valve closing in another part-lift position, other than a position that corresponds to its maximum lift. In the prior art system, an attempt to close the two-way hydraulic valve when the engine valve is well on its way towards closing, would cause intense oscillations in the system if that hydraulic valve is a simple ON-OFF valve. Utilising a proportional hydraulic control valve may solve the shock wave and uncontrollable oscillations problem, but that would drastically increase the cost of the system and its control complexity.

It is desirable to provide inexpensive means for improved flexibility in the control of the closing phase of an engine valve.

According to an aspect of the present invention, a valve actuation system for providing added motion in the valve mechanism of an internal combustion engine with at least one inlet valve and at least one exhaust valve is provided, the valve mechanism comprising a rotatable camshaft with a cam curve including rising and falling ramps designed to interact with a valve control plunger being movable inside a cylinder for actuation of the inlet or exhaust valve under the action of a valve spring, the control plunger cylinder communicating with a hydraulic fluid feed line via a check valve and with a hydraulic control circuit allowing a return movement of a valve to be delayed in relation to the timing of the corresponding falling ramp, which is characterized in that the hydraulic control circuit comprises a first and a second hydraulic fluid flow restrictor connected to the control plunger cylinder at different levels along its longitudinal axis, and that a selector valve enables a connection between the cylinder and the hydraulic control circuit to be opened via either one only or both flow restrictors. This arrangement of the valve actuation system makes it easier to decelerate the engine valves during their closing phase before stopping at an intermediate position.

BRIEF DESCRIPTION OF THE DRAWINGS

The invention will be described in more detail below with reference to an exemplary embodiment which is shown in the drawings attached, in which.

DETAILED DESCRIPTION

Figure 1:
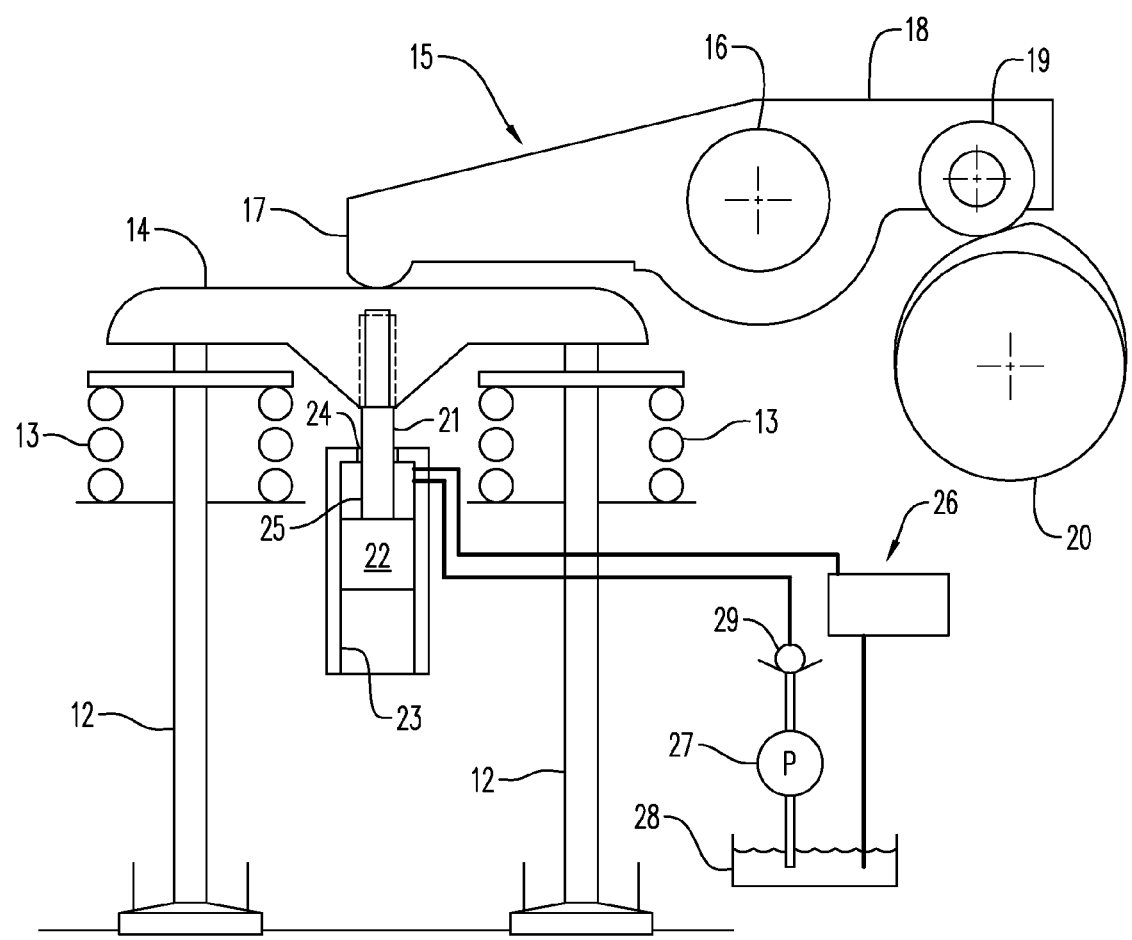
FIG. 1 shows a diagram of a valve mechanism according to an exemplary embodiment of the invention.

The valve mechanism shown in schematic form in FIG. 1 is located in a cylinder head and comprises double inlet valves 12 with valve springs 13 and a common yoke 14. The yoke is acted upon in a known manner by a rocker 15 which is pivotally supported on a rocker shaft 16. The rocker 15 has a valve pressure arm 17 on one side of the shaft and a cam follower 18 on the other side, the follower being provided with a rocker arm roller 19 that interacts with an overhead camshaft 20. Alternatively a camshaft located at a lower level in the engine can interact with the rocker by way of a valve tappet and a push rod.

The yoke 14 is mounted on a piston rod 21 that is supported so that it is vertically displaceable by a plunger 22 in a cylinder 23. The end 24 of the cylinder is provided with sealing against the plunger rod 21, so that a fluid-tight space 25 is formed between the plunger and the end. The plunger cylinder 23 is connected via a pipe and a control unit 26 to a pressure reservoir 28. A pump 27 delivers hydraulic fluid from the reservoir 28 to fill the cylinder space 25 via a non-return valve 29, when the camshaft 20 opens the engine valves 12. The control unit 26 controls dumping of the hydraulic fluid from the cylinder space 25 into the reservoir 28, during the return stroke of the plunger 22.

The control unit 26 is shown in more detail in FIGS. 2-5 and comprises an ON/OFF solenoid valve 30 and a two-position mode selection valve 31. The two valves 30, 31 are connected in series via a hydraulic line 32. In FIGS. 2-5 line 32 is shown leading to the hydraulic fluid supply line but, when using engine lubricating oil in the hydraulic circuit, the hydraulic fluid can be dumped via the valve 30 to any engine oil return passage. In an energized position, the ON/OFF valve 30 blocks a fluid flow via the hydraulic line 32, and in the other, de-energized position, which is defined by a helical spring 33, the ON/OFF valve 30 allows fluid to flow from the plunger space to the reservoir 28. The selector valve 31 makes it possible to select one of two different function modes. For this purpose, the valve 31 is connected to the plunger space 25 via a first hydraulic line 34 and a second parallel line 35. The lines 34, 35 are connected to the control plunger cylinder 23 at two different levels along its longitudinal axis, where the first level is at a distance from the bottom end of the plunger cylinder. A third hydraulic line 36, which includes a first fluid restrictor 37, connects the bottom of the cylinder 23 with the first hydraulic line 34. There is also a connection between the two lines 34, 35, which includes a second fluid restrictor 38.

Figure 2:
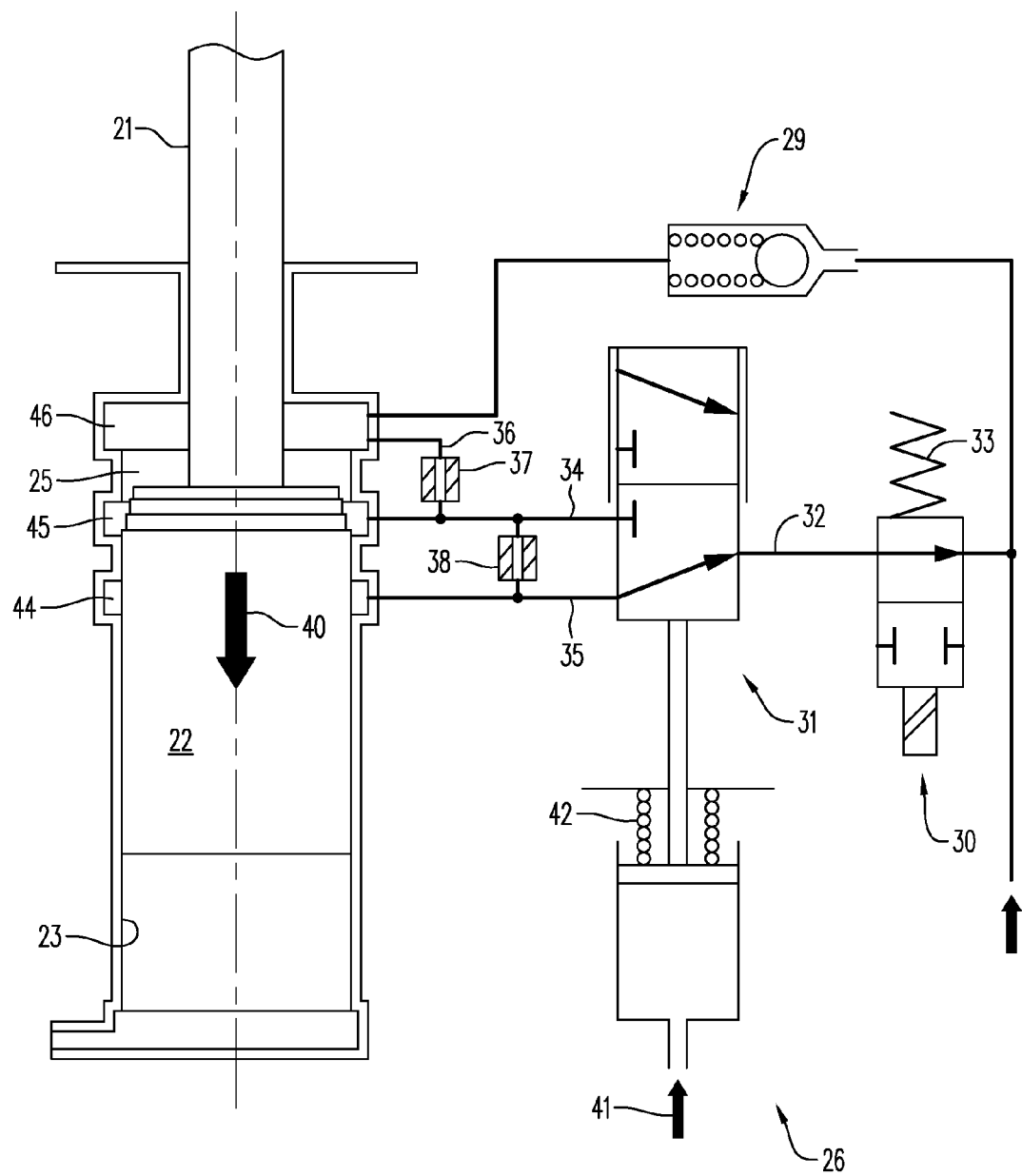
FIGS. 2-5 show a diagram of a hydraulic control circuit used for controlling the valve mechanism in FIG. 1, in four different modes of use.

In FIG. 2, the plunger 22 is moving in the direction of the arrow 40 while hydraulic fluid, for example engine lubrication oil, flows into the cylinder space 25 via the non-return valve 29. The solenoid valve 30 is shown de-energized, i.e. in its open position but can also be in its other energized position. The selector valve 31 is shown in its energized position, where a control pressure indicated by the arrow 41 has compressed a helical spring 42.

Figure 3:
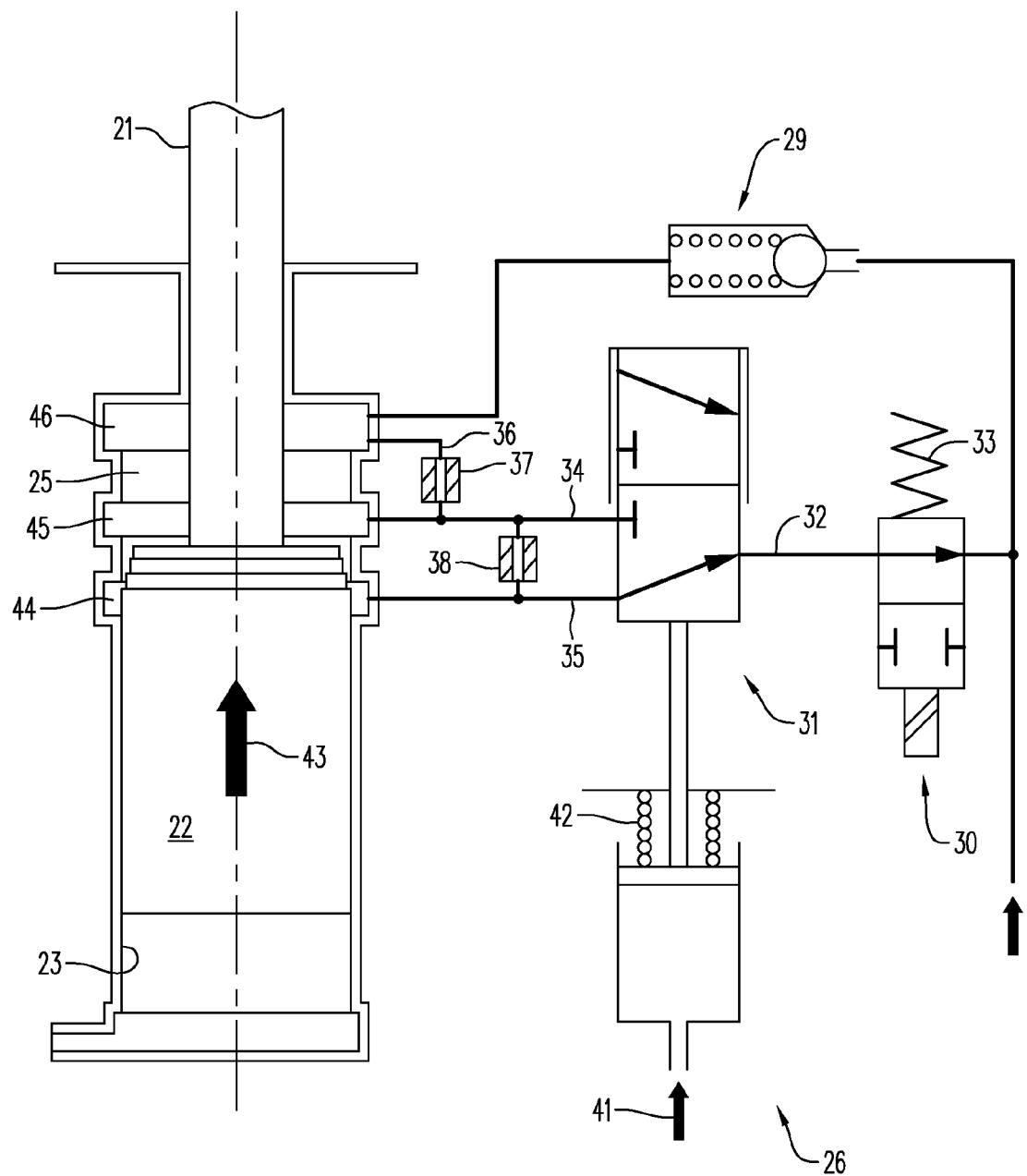

FIG. 3 shows the hydraulic valves 30, 31 in the same position as in FIG. 2, but plunger 22 during its return stroke, indicated by the arrow 43. In this mode of operation, the valve mechanism follows the lifting curve 10 up and then down, until the plunger end reaches the position of a ring-shaped cylinder port 44 that is connected to the hydraulic line 35. When the plunger closes the port 44, the hydraulic fluid instead flows via the restrictor 38. The flow restrictor 38 is chosen such that the plunger gets sufficiently decelerated during closing of port 44 so as to enable it to be stopped by closure of the ON-OFF valve 30 without excessive oscillations occurring in the system. When the plunger eventually reaches and closes a second ring-shaped cylinder port 45, the fluid flows via a port 46 connected to the line 36 and the restrictors 37, 38 until the plunger reaches the end of its stroke. The flow restrictor 37 is designed to retard the plunger sufficiently, so that the landing of the valve mechanism can take place without risk for damage to the contact surfaces in the valve mechanism.

Figure 4:
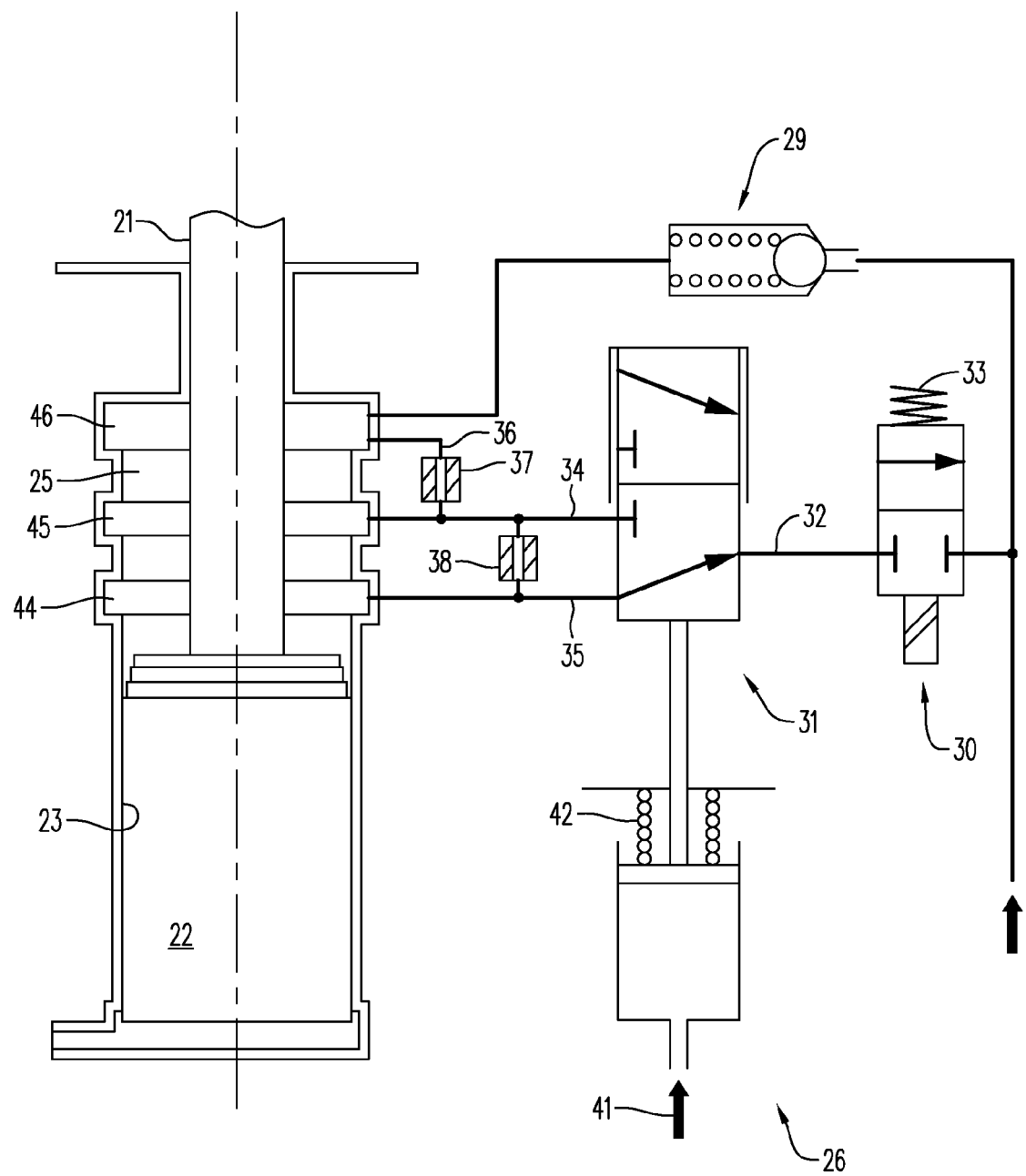

A second mode of operation is shown in FIG. 4, where the selector valve 31 still is in the energized position, but now the ON/OFF valve 30 is energized to block the flow through the valve. In this mode, the valve mechanism follows the cam curve in the direction of opening the engine valves 12, but the valves 12 are blocked for movement in the opposite, return direction until the ON/OFF valve 30 is de-energized to move to its open position by the action of the helical spring 33. Thus, the closing of the engine valves 12 can be delayed in a controlled manner. The closing movement follows the same curve as described above, which is defined by the hydraulic flow restrictors 37, 38.

Figure 5:
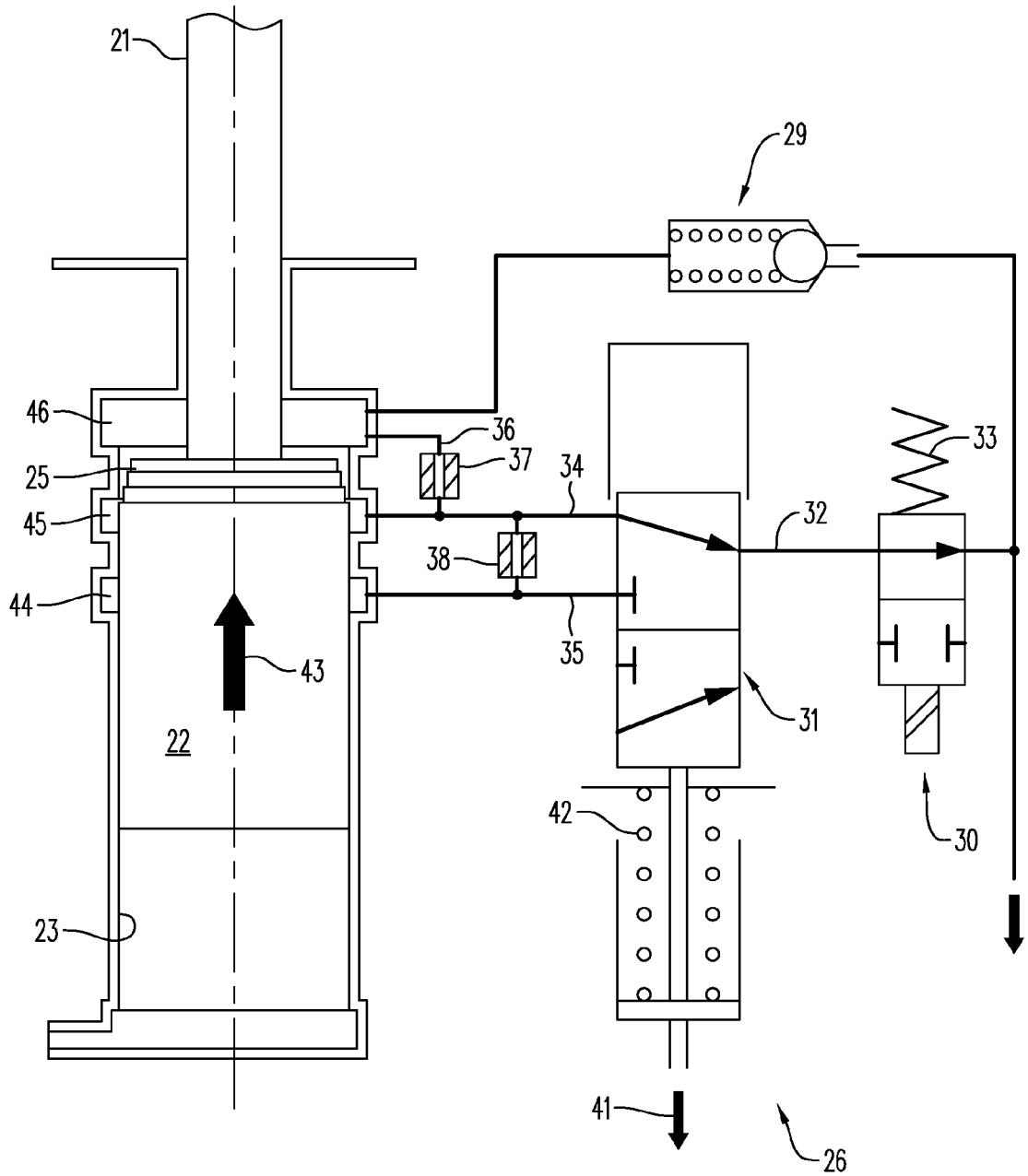

A third mode of operation is shown in FIG. 5, where the plunger 22 is performing a return stroke, indicated by the arrow 43. Both hydraulic valves 30, 31 are in their de-energized positions, so that the valve 30 is open and the valve 31 is in its second mode, allowing the hydraulic fluid to flow via the second port 45. Thus, there are no restrictors to throttle the flow from the plunger cylinder to valve 31 when the plunger 22 moves between the port 44 and the port 45 during the return stroke. This allows the plunger 22 to make a rapid return stroke, either following the cam profile or after having been delayed by a controlled blocking of the ON/OFF valve 30. The final part of the return stroke is decelerated by means of the flow restrictor 37, as described above.

The above described hydraulic control circuit makes it possible to modify the return movement of the plunger 22 to adapt the operation to different needs. The valve actuation system according to the invention has been demonstrated in its application to a pair of inlet valves. It is also possible to apply the apparatus to exhaust valves. This application can be used, for example, for internal return of the exhaust gas, so-called internal exhaust gas recirculation (EGR), a variation of the exhaust valve closing sequence being capable of influencing the quantity of internal EGR by adjusting the overlap between the inlet and exhaust valves on completion of the exhaust stroke.

The invention must not be regarded as being limited to the exemplary embodiment described above, a number of further variants and modifications being feasible within the scope of the following patent claims. For example, the control plunger cylinder 21-25 may be designed differently as may the control circuit 26. The plunger cylinder 21-25 may, for example, act directly on a valve. In the case of a camshaft located low down, the plunger cylinder 21-25 may interact with the push rod or the valve tappet. The cylinder 23 may be provided with more than two ports connected to it at different levels along its longitudinal axis. As a further example, the selector valve 31 may be electrically operated instead of being hydraulically operated. Another possible modification of the system may involve incorporating the function of the first restrictor 37 into the control port profile of the plunger.

The invention claimed is:

1. A valve actuation system for providing added motion in a valve mechanism of an internal combustion engine, the valve actuation system comprising the valve mechanism, the valve mechanism comprising at least one inlet valve and at least one exhaust valve, the valve mechanism comprising a rotatable camshaft with a cam curve including rising and falling ramps designed to interact with a valve control plunger that is movable inside a cylinder for actuation of the inlet or exhaust valve under action of a valve spring, the plunger cylinder communicating with a hydraulic fluid feed line via a check valve and with a hydraulic control circuit allowing a return movement of an engine valve to be delayed in relation to the timing of the corresponding falling ramp, wherein the hydraulic control circuit comprises a first and a second hydraulic fluid flow restrictor connected to the plunger cylinder at different levels along a longitudinal axis of the plunger cylinder, and a selector valve enables a connection between the cylinder and hydraulic control circuit to be opened via at least one of the first and second flow restrictors.

2. The valve actuation system as claimed in claim 1, wherein the selector valve is connected in series with an ON/OFF valve for opening and closing the connection to the return line.

3. The valve actuation system as claimed in claim 2, wherein the plunger cylinder is provided with an outlet port to the hydraulic fluid return line at a distance from an end of the plunger stroke that corresponds to closed engine valve.

4. The valve actuation system as claimed in claim 3, characterized in that the plunger cylinder is provided with a second outlet port to the return line, the second outlet port being disposed at a distance from the first outlet and at a further distance from the end of the plunger stroke.

5. The valve actuation system as claimed in claim 4, wherein the plunger cylinder is provided with a third outlet port to the outlet line at the end of the plunger stroke which corresponds to closed engine valve.

6. The valve actuation system as claimed in claim 1, wherein the control member comprises a hydraulic piston cylinder which is mechanically connected to the valve and can be actuated by the hydraulic control circuit.

7. The valve actuation system as claimed in claim 1, wherein the control member is applied to the engine exhaust valves for internal exhaust gas recirculation.

8. The valve actuation system as claimed in claim 1, wherein the control member is applied to the engine inlet valves for varying the closing sequence.

9. The valve actuation system as claimed in claim 1, wherein the plunger cylinder is provided with an outlet port to the hydraulic fluid return line at a distance from an end of the plunger stroke that corresponds to closed engine valve.

10. The valve actuation system as claimed in claim 9, characterized in that the plunger cylinder is provided with a second outlet port to the return line, the second outlet port being disposed at a distance from the first outlet and at a further distance from the end of the plunger stroke.

11. The valve actuation system as claimed in claim 10, wherein the plunger cylinder is provided with a third outlet port to the outlet line at the end of the plunger stroke which corresponds to closed engine valve.

12. The valve actuation system as claimed in claim 9, wherein the control member comprises a hydraulic piston cylinder which is mechanically connected to the valve and can be actuated by the hydraulic control circuit.

13. The valve actuation system as claimed in claim 9, wherein the control member is applied to the engine exhaust valves for internal exhaust gas recirculation.

14. The valve actuation system as claimed in claim 9, wherein the control member is applied to the engine inlet valves for varying the closing sequence.

* * * * *